UNITED STATES PATENT OFFICE.

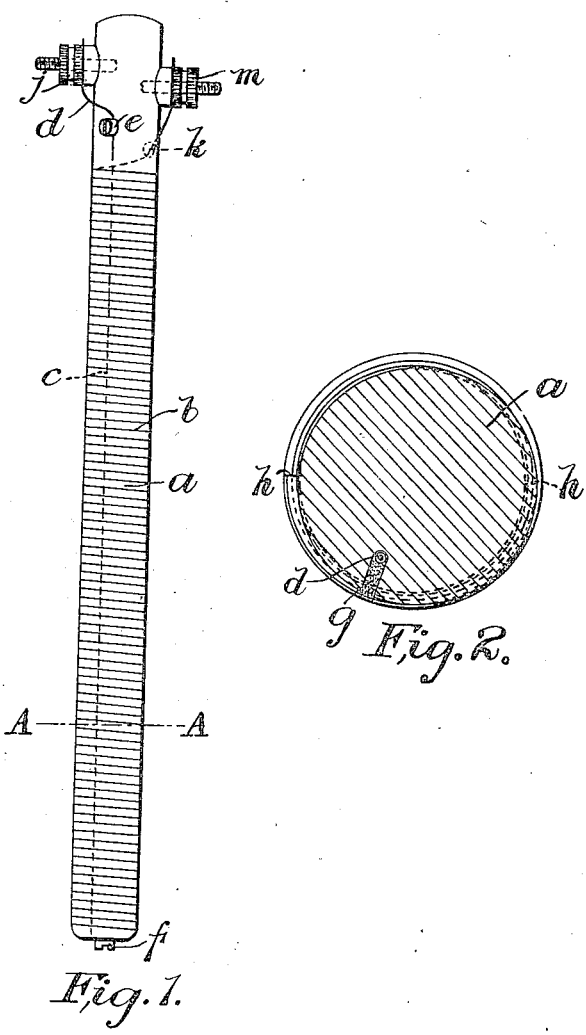

MEYER WILDERMAN AND ROBERT LUDWIG MOND, OF LONDON, ENGLAND.

THERMOPILE.

No. 813,682.          Specification of Letters Patent.          Patented Feb. 27, 1906.

Application filed August 14, 1905. Serial No. 274,162.

*To all whom it may concern:*

Be it known that we, MEYER WILDERMAN, Ph. D., B. Sc., a subject of the Czar of Russia, residing at 10 Elers road, South Ealing, London, W., and ROBERT LUDWIG MOND, M. A., a subject of the King of Great Britain and Ireland, residing at 27 Berkeley Square, London, W., England, have invented certain new and useful Improvements in and Relating to Thermopiles, of which the following is a specification.

Our invention relates to improvements in thermopiles and in the method of manufacturing them.

In the usual method of constructing thermopiles the two different metals or alloys are soldered or brazed or fused together; but these methods of uniting the metals present several undesirable features. If the junction between the two metals be effected by soldering or brazing, the thermopiles must not be used for such temperatures as would cause the solder to melt. The two metals or alloys are heated to a considerable temperature, which in some cases affect their properties. The molecular properties of the solder itself, as well as the properties of the thermopile, are very often changed by the heating. The solder introduces a strange body between the two opposite metals and affects the thermopile more or less in accordance with the thickness of the uniting material. If the junction between the two metals be effected by fusion, the metals are heated to a high temperature and their properties are changed at the junction. An alloy of varying composition is formed at the junction, and the composition may vary somewhat at all the junctions when there are several. It is, however, most important that all the joints shall be uniform if the thermopile is to be uniform in its action. The manufacture of thermopiles with soldered, brazed, or fused junctions is, moreover, a slow process, requiring much skill where there are so many joints as are necessary in constructing an instrument to produce a large electromotive force, and it does not result in so sensitive an instrument as is desired for some purposes.

The object of our invention is to produce a method of manufacturing thermopiles in which heating and brazing, soldering, or fusing are not necessary for effecting a junction between the two plates and to provide an improved thermopile which shall be free from the objections mentioned above and more sensitive and compact than the ordinary thermopiles.

Our invention consists in a method of manufacturing thermopiles in which a compound wire, strip, or plate comprising a core of one metal or alloy and a covering of another metal or alloy is drawn to a desired degree of thinness, portions of the compound metal being then suitably immersed in a reagent until the outer metal is removed and the core is laid bare at the immersed portions of the wire, strip, or plate, the alternate compound and single portions of which are then stacked, wound, or otherwise arranged so that one end of each compound portion may be brought to one temperature while the other end of each compound portion is at another temperature. In this method of manufacturing a thermopile the junction between the two metals—the outer cover and the core—is effected without heating and no soldering or brazing is employed at the junctions.

Our invention also consists in a thermopile constructed from a drawn compound wire, strip, or plate comprising a core of one metal or alloy and a covering of another metal or alloy in which lengths of the outer metal are removed at preferably regular distances apart from the inner metal, and the wire, strip, or plate is stacked, wound, or otherwise arranged so that one set of corresponding ends of the junctions may be subjected to a different temperature or light from the other set.

In carrying out our invention according to one construction we employ a compound wire comprising a core of one metal—say, for instance, platinum—surrounded by a coating of another metal—say iron—both metals being of suitable thickness. We draw this wire in any convenient manner until its diameter is very small—say 0.001 inch—although this dimension may be less or considerably more, as required. This wire is then bent into regular zigzag, U, and inverted-U, spiral, or other convenient regular form and is partially immersed in a bath of acid, so that at equal distances along the wire equal lengths of it are immersed. The acid should be such that it removes the outer metal from the immersed portions of the wire without injuring the core. It will be understood that when the outer covering has been removed from the portions of the wire which were immersed there are a number of compound portions alternating with single or bare portions of the core throughout the length of the wire under treatment. At the compound portions the outer cover of iron is in metallic contact with the platinum core, and if one set of corresponding ends of the compound portions be kept at one temperature and the other set at another temperature the contact-surface in each compound portion will act as two junctions, a heated one and a cool one, and an electromotive force will be set up in the ordinary manner.

The wire may be stacked with suitable insulating material, so that one set of corresponding ends of the junctions may be on one side and the other set on the other side. By this arrangement a very large number of junctions may be provided in a thermopile of very small size and weight, the instrument being of greater sensitiveness and capable of producing a higher electromotive force than is possible with a thermopile of a similar size and weight having fused, soldered, or brazed junctions.

A form of our invention which is applicable for measuring the intensity of light is shown in Figures 1 and 2 of the accompanying drawings, Fig. 1 being an elevation of the thermopile, and Fig. 2 an enlarged section on the line A A of Fig. 1.

On a circular rod $a$ of porcelain, ebonite, or glass a thread or spiral groove $b$ is cut with a small pitch—say one millimeter. A longitudinal groove $c$ is formed in the rod, and a drawn compound wire $d$, having, for instance, a platinum core and an iron cover and drawn to a very small diameter, is secured by a suitable screw $e$ and terminal screw $j$ or the like at one end of the rod and is laid in the groove $c$, along which it extends to the other end of the rod, where it may be secured by a screw $f$. The groove $c$ is filled with a suitable insulating material $g$, (see Fig. 2,) so as to cover the wire $d$, which is then wound around the rod in the spiral groove, the end of the wire being secured by a screw $k$ and terminal screw $m$ or other suitable means situated, preferably, diametrically opposite the other terminal. One-half of the rod is coated with paraffin-wax or the like, so as to cover one-half of each spiral portion of the wire. The rod is then immersed in an acid or another suitable chemical reagent adapted to dissolve the outer metal from the parts of the compound wire which are not protected by the wax. When the unprotected parts of the cover have been removed, the paraffin is dissolved from the compound portions of the wire. Thus the portion which was exposed to the acid has the outer metal removed and the core exposed, but the protected portions remain compound. The two sets or series of corresponding ends of the compound portions, and consequently of the junctions, (indicated by the letter $h$,) are situated diametrically opposite one another. If one set of junctions be exposed to light and the other set be kept in the dark, the electromotive forces at the junctions set up a current the intensity of which may be indicated by a galvanometer or other suitable recording device in a well-known manner.

On a rod seven or eight millimeters diameter and five centimeters long we can provide, say, one hundred thermo-junctions—fifty on the side exposed to light and fifty on the other side. Such a thermopile is instantaneous in its action and is obviously exceedingly compact and light, besides being very easily made at comparatively low cost. Two or more of these thermopiles may be connected together in series or in parallel.

It will be obvious that we may construct a thermopile with very many more junctions than are provided in the example given above and still have a small, compact, and light instrument.

The metals employed for the compound wire may be of any suitable kind; but the acid or the chemical reagent used should not be of such a kind as to be able to attach the metal composing the core.

Our invention may be used for measurements of temperature instead of the Wheatstone bridge and platinum thermometer. It may serve also as a pyrometer for the measurement of high temperatures or as a photometer for the measurement of the intensity of light. It may be employed also in some cases where a constant electromotive force is required for long periods instead of accumulators—as, for instance, on motor-cycles and the like, where lightness and compactness are of great value.

Having thus described our invention, what we claim as new, and desire to secure by Letters Patent, is—

1. A method of manufacturing thermopiles, consisting in drawing out to the desired thinness a compound wire strip or the like composed of a core and cover of different materials, removing the cover at intervals and so arranging the alternate compound and single portions that one set of corresponding ends of the various compound portions may be exposed to one temperature and the other set of corresponding ends may be exposed to another temperature, substantially as described.

2. A method of manufacturing thermopiles, consisting in drawing out to the desired thinness a compound wire strip or the like composed of a core and cover of different materials, removing the outer metal at intervals by immersing portions of the wire strip in a suitable acid or reagent and so arranging the alternate compound and single portions that one set of corresponding ends of the various compound portions may be exposed to one temperature and the other set of corresponding ends may be exposed to another temperature, substantially as described.

3. A method of manufacturing thermopiles, consisting in drawing out to the desired thinness a compound wire strip or the like composed of a core and cover of different materials, coating the compound wire strip at intervals with a substance impervious to acid or reagent and immersing the wire or strip in acid or reagent until the outer metal between such coated portions is removed and so arranging the alternate compound and single portions that one set of corresponding ends of the various compound portions may be exposed to one temperature and the other set of corresponding ends may be exposed to another temperature, substantially as described.

4. A thermopile consisting of a drawn metal or alloy wire strip or the like having at intervals in its length and in metallic contact therewith a cover of another drawn metal or alloy, the wire strip or the like being so arranged that one set of corresponding ends of the covered portions can be exposed to one temperature, and the other set to another temperature, substantially as described.

5. A thermopile consisting of a rod of insulating material upon which is wound a drawn wire around and drawn into metallic contact with which are pieces of a metal different from that of the wire, the covered portions of the wire being on one side of the rod and the uncovered portions on the other side so that one set of corresponding ends of the covering portions are on one side of the rod and the other set of corresponding ends are on the other side, substantially as and for the purpose described.

In testimony whereof we have signed our names to this specification in the presence of two subscribing witnesses.

MEYER WILDERMAN.
ROBERT LUDWIG MOND.

Witnesses:
BERTRAM H. MATTHEWS,
FRANCIS J. BIGNELL.